United States Patent Office 3,134,804
Patented May 26, 1964

3,134,804
METHOD FOR THE PREPARATION OF 1,1,1-TRI-HALO-2-CYANO-2-ACETOXYPROPANE
Arthur J. Roth, Evanston, Ill., assignor to International Minerals & Chemical Corporation, a corporation of New York
No Drawing. Filed Sept. 14, 1960, Ser. No. 55,828
5 Claims. (Cl. 260—465.4)

This invention relates to an improved method for the preparation of a 1,1,1-trihalo-2-cyano-2-acetoxypropane. In its preferred aspect, this invention relates to an improved method for the preparation of 1,1,1-trifluoro-2-cyano-2-acetoxypropane.

Trihalomethyl acrylonitrile is a monomeric material which is useful as a starting material in the preparation of polymers containing a high proportion of halogen. Of particular significance in this application is the monomer trifluoromethyl acrylonitrile. These trihalomethyl acrylonitriles are generally made by the pyrolysis of 1,1,1-trihalo-2-cyano-2-acetoxypropane to yield the desired acrylonitrile derivative and acetic acid.

In the past, the preparation of 1,1,1-trifluoro-2-cyano-2-acetoxypropane has been produced by a two-step method which involves first the preparation of 1,1,1-trifluoroacetone cyanohydrin in an aqueous medium with recovery and purification of said cyanohydrin. The cyanohydrin is then reacted with acetic anhydride to produce the corresponding acetoxy derivative. This procedure is described in an article by Darrall et al. in the Journal of the Chemical Society, 1951, page 2331. The prior art procedure is generally quite inefficient in that there is considerable loss in the preparation of the cyanohydrin which is a relatively unstable compound. Also, the process requires several steps which by their nature permit the loss of the desired product and lower the yields. In accordance with the present invention, I have discovered that 1,1,1-trihalo-2-cyano-2-acetoxypropane can be produced in reasonable yields by a single step process which avoids the necessity for first recovering and purifying the intermediate 1,1,1-trihaloacetone cyanohydrin.

It is, therefore, an object of the present invention to provide an improved method for the preparation of 1,1,1-trihalo-2-cyano-2-acetoxypropane.

It is another object of the present invention to provide an improved method for the preparation of 1,1,1-trifluoro-2-cyano-2-acetoxypropane.

Additional objects of this invention will be apparent from the description which follows.

In its broadest aspect, the method of the present invention involves reacting in dry ether equimolar quantities of a 1,1,1-trihaloacetone, a cyanide selected from the group consisting of alkali metal cyanides and ammonium cyanide, and acetic anhydride in the presence of a catalytic amount of acetic acid, and recovering the desired 1,1,1-trihalo-2-cyano-2-acetoxypropane.

Illustrative trihaloacetone which can be employed in the method of the present invention include 1,1,1-trifluoroacetone, 1,1,1-trichloroacetone, 1-chloro-1,1-difluoroacetone, 1,1-dichloro-1-fluoroacetone, 1-bromo-1,1-difluoroacetone, and the like. It is preferred that the acetone contain at least one fluorine atom, and the preferred acetone is 1,1,1-trifluoroacetone.

Illustrative cyanides which can be used in the method of the present invention include sodium cyanide, potassium cyanide, lithium cyanide, and ammonium cyanide. The preferred cyanide is sodium cyanide which results in the preparation of sodium acetate as a by-product of the reaction.

Acetic acid is used in the reaction in catalytic quantities which, illustratively, can vary between trace amounts and up to about 0.25 mole of acetic acid per mole of acetic anhydride. Higher quantities of acetic acid, although effective, are undesirable in that it is difficult to separate the acetic acid from the desired 1,1,1-trihalo-2-cyano-2-acetoxypropane product. It should be noted, however, that this may not be a disadvantage when the desired product is later subjected to pyrolysis in the preparation of the trihalomethyl acrylonitrile compound. The preferred practice, however, is to use small quantities of acetic acid in carrying out the reaction.

In a preferred embodiment of the present invention, equimolar quantities of 1,1,1-trifluoroacetone and sodium cyanide are mixed in dry ethyl ether at a temperature of about 0° C. An equivalent quantity of acetic anhydride in admixture with a catalytic amount of acetic acid is slowly added with agitation to the reaction mixture. The agitation of the mixture at the low temperature can be continued for about 2 hours. The mixture is then refluxed for about 2 to about 6 hours and the ether is removed by distillation. The ether-free material is then refluxed for an additional 2 to 6 hours at about 50 to 65° C., and the mixture cooled to room temperature which brings about a precipitation of the sodium acetate. The solid sodium acetate is separated by filtration or centrifugation and the filtrate is distilled under reduced pressure to give 1,1,1-trifluoro-2-cyano-2-acetoxypropane having a boiling point of about 67° at 40 mm. Hg pressure.

The preferred ether employed as the reaction medium is ethyl ether. However, other solvents which are chemically inert in the reaction environment, preferably polar and preferably having a boiling point below about 50° C. at normal pressure can be employed. Higher boiling inert solvents must be removed by distillation under reduced pressure to avoid temperatures higher than about 60° C. In removing ethyl ether by distillation after an initial refluxing period, any unreacted trifluoroacetone is also distilled over, since this material boils at a temperature below the boiling point of ethyl ether.

The following examples are intended to illustrate the underlying principles of the invention and should not be construed as unduly limiting thereof.

*Example 1*

200 ml. of dry ethyl ether was placed in a 1000 ml., three-necked, round bottom flask, fitted with a stirring apparatus, a dropping funnel and a Dry Ice, cold finger condenser. The ether was chilled in an ice bath and 49 grams sodium cyanide added. To this mixture 112 grams of 1,1,1-trifluoroacetone was added with stirring. 102 grams of acetic anhydride and 15 grams of acetic acid were mixed and the mixture slowly added dropwise to the chilled reaction mixture with rapid stirring. The reaction proceeded slowly and smoothly to completion. The mixture was stirred for an additional 2 hours at the low temperature after which it was refluxed for about 6 hours at a temperature of about 35 to 38° C. After refluxing, the ether was distilled from the mixture until the pot temperature reached 55° C. The mixture was set back on reflux for 3 hours at about 55° C. After 3 hours of reflux, the mixture was allowed to cool and was then filtered and extracted with ether followed by alcohol.

The separated solids were extracted several times into ether and twice into alcohol. The extracts were combined with the filtrates and most of the ether and alcohol in the combined material was removed by distillation at atmospheric pressure. The material was then distilled under reduced pressure giving 64.3 grams of compound having a boiling point 65–69° C. at 40 mm. of mercury and a refractive index $n_D^{20} = 1.355$. A yield of about 38+ percent was obtained.

Example II

The apparatus used in the preceding example was also employed in this example. 150 ml. of anhydrous ether, 56 grams of 1,1,1-trifluoroacetone and 24.5 grams of sodium cyanide were mixed and chilled on an ice bath. A mixture containing 51 grams of acetic anhydride and 15 grams of acetic acid were added slowly, dropwise, to the mixture over a period of about 1½ hours. The mixture was then stirred for several hours at room temperature followed by reflux for about 5 hours at about 35° C. The ether was removed by distillation until the pot temperature rose to about 55° C. and stirring was continued until the reaction stopped. The mixture was filtered and 42 grams of a finely divided white solid were separated. This corresponded to the theoretical amount of sodium acetate expected (41 grams). The liquid separated was of a clear brownish color. It was dried with anhydrous sodium sulfate and the excess ether removed by distillation. The product was then distilled under reduced pressure of 40 mm. of mercury and 41.8 grams of material boiling between 60 and 70° C. were collected. This material had a refractive index $$n_D^{25} = 1.372$$

The high $n_D^{25}$ of the material appeared to be due to some contamination by acetic acid.

Example III

This example was carried out in apparatus similar to that of Example I with the exception that the stirrer was provided with a mercury seal and a more efficient condenser was employed to ensure more thorough mixing and retention of all materials.

45 grams of 1,1,1-trifluoroacetone and 25 grams of sodium cyanide were mixed and chilled in 150 ml. anhydrous ether in an ice bath. A mixture containing 51 grams of acetic anhydride and 30 grams of acetic acid was added slowly with rapid stirring to the cooled mixture. The mixture was heated to 35° C. and stirred for 2 hours. The ether portion was removed by distillation and the pot temperature of the reaction mixture was allowed to rise to 65° C. The ether-free reaction mixture was then held at reflux for 3 hours following which the contents were cooled and filtered. The filtered solids were washed several times with ether and the ether was then added to the original separated liquid. The liquids were dried with anhydrous magnesium sulfate and distilled under reduced pressure to yield 40.12 grams of product having a refractive index $n_D^{25} = 1.3670-1.3689$ and about 10 grams of after-run consisting mostly of unidentified white solid.

Example IV

The total amount of product obtained in Example III was subjected to pyrolysis to convert the same to trifluoromethyl acrylonitrile. In carrying out the pyrolysis, the 1,1,1-trifluoro-2-cyano-2-acetoxypropane was passed into a vaporizing tube in admixture with nitrogen where it was vaporized at a temperature of about 150 to 160° C. The vaporized material was then passed to a pyrolysis tube where the temperature, at the beginning of the reaction, was about 520° C. During pyrolysis, the temperature rose to 560 to 580° C., remaining at this temperature until the pyrolysis was complete. All of the effluent from the pyrolysis tube was condensed and collected following which the system was swept slowly with nitrogen. The condensate was distilled, yielding 14.00 grams of trifluoromethyl acrylonitrile. This represents a 70% conversion. The after-run consisted primarily of acetic acid and some starting material, viz., 1,1,1-trifluoro-2-cyano-2-acetoxypropane. The starting material apparently contained some free acetic acid since somewhat more acetic acid was recovered than had been expected from pure calculation.

While this invention has been described and exemplified in terms of its preferred embodiments, those skilled in the art will appreciate that changes can be made without departing from the scope and spirit of the invention.

I claim:

1. A method for the preparation of a 1,1,1-trihalo-2-cyano-2-acetoxypropane which comprises admixing at a temperature of about 0° C. equimolar quantities of a 1,1,1-trihaloacetone and a cyanide selected from the group consisting of alkali metal cyanides and ammonium cyanide in a dry polar solvent having a boiling point below about 50° C. which is chemically inert in the reaction environment, slowly adding to said mixture an equivalent amount of acetic anhydride in the presence of a catalytic amount of acetic acid, and recovering the desired 1,1,1-trihalo-2-cyano-2-acetoxypropane product.

2. A method according to claim 1 wherein the reactants are mixed in dry ethyl ether at a temperature of about 0° C.

3. A method according to claim 1 wherein 1,1,1-trifluoroacetone and sodium cyanide are employed.

4. A method for the preparation of a 1,1,1-trihalo-2-cyano-2-acetoxypropane which comprises mixing equimolar quantities of a 1,1,1-trihaloacetone with cyanide selected from the group consisting of alkali metal cyanide and ammonium cyanide, and dry ethyl ether at a temperature of about 0° C.; slowly adding with agitation an equivalent amount of acetic anhydride in admixture with a catalytic amount of acetic acid; refluxing said mixture for about 2 to about 6 hours; removing the ether from said mixture by distillation; refluxing the ether-free material for about 2 to about 6 hours at a temperature between about 50° C. and about 60° C.; cooling the said material; separating solid precipitated acetate from the cooled material; and recovering the resultant 1,1,1-trihalo-2-cyano-2-acetoxypropane product.

5. A method for the preparation of 1,1,1-trifluoro-2-cyano-2-acetoxypropane which comprises mixing equimolar quantities of 1,1,1-trifluoroacetone with sodium cyanide in dry ethyl ether at a temperature of about 0° C.; slowly adding with agitation an equivalent quantity of acetic anhydride in the admixture with a catalytic amount of acetic acid; and refluxing said mixture for about 3 hours; distilling the ether from said mixture; refluxing the ether-free material for about 3 hours at a temperature from about 50° C. to 60° C.; cooling said material to room temperature; filtering said mixture to remove solid sodium acetate; and distilling the filtrate under reduced pressure to recover 1,1,1-trifluoro-2-cyano-2-acetoxypropane.

References Cited in the file of this patent

Darrall et al.: Journal of the Chemical Society (London), 1951, pages 2329–2332.